United States Patent
March

(10) Patent No.: US 8,221,174 B2
(45) Date of Patent: Jul. 17, 2012

(54) AMPHIBIOUS VEHICLE

(76) Inventor: J. David March, Newport Coast, CA (US)

( * ) Notice: Subject to any disclaimer, the term of this patent is extended or adjusted under 35 U.S.C. 154(b) by 359 days.

(21) Appl. No.: 12/203,146

(22) Filed: Sep. 3, 2008

(65) Prior Publication Data

US 2009/0061702 A1 Mar. 5, 2009

Related U.S. Application Data

(60) Provisional application No. 60/969,673, filed on Sep. 3, 2007.

(51) Int. Cl.
*B60F 3/00* (2006.01)

(52) U.S. Cl. .................. 440/12.51; 440/12.5

(58) Field of Classification Search ...... 440/12.5–12.61, 440/40–43; 114/271, 288
See application file for complete search history.

(56) References Cited

U.S. PATENT DOCUMENTS

| | | | |
|---|---|---|---|
| 935,610 A | 9/1909 | Mauksch | |
| 2,251,621 A * | 8/1941 | Van Hoorn | 114/355 |
| 2,399,141 A | 4/1946 | Quinn | |
| 3,020,872 A | 2/1962 | Gierczic | |
| 3,090,973 A | 5/1963 | Levinson | |
| 3,183,663 A | 5/1965 | Sfredda | |
| 3,646,903 A | 3/1972 | Hansson | |
| 3,688,731 A | 9/1972 | Houle | |
| 3,996,869 A * | 12/1976 | Hadley | 114/290 |
| 4,730,664 A | 3/1988 | Forsthuber et al. | |
| 4,958,584 A | 9/1990 | Williamson | |
| 5,181,478 A | 1/1993 | Berardi | |
| 5,562,066 A | 10/1996 | Gere et al. | |
| 5,590,617 A | 1/1997 | Gere et al. | |
| 6,216,622 B1 | 4/2001 | Lindstrom et al. | |
| D449,565 S | 10/2001 | Royle | |
| 6,679,543 B2 | 1/2004 | Messano | |
| 6,712,652 B2 | 3/2004 | Roycroft | |
| 6,764,358 B2 | 7/2004 | Gibbs | |
| 6,776,672 B2 | 8/2004 | Roycroft | |
| 6,796,856 B2 | 9/2004 | Roycroft et al. | |
| 6,808,430 B1 | 10/2004 | March | |
| 6,821,166 B2 | 11/2004 | Roycroft et al. | |
| 6,886,837 B2 | 5/2005 | Gibbs | |
| 6,910,928 B2 | 6/2005 | Pease | |
| 6,957,991 B2 | 10/2005 | Gibbs | |
| 7,011,557 B2 | 3/2006 | Gibbs | |
| D523,388 S | 6/2006 | Plumb | |
| 7,089,822 B2 | 8/2006 | Gibbs et al. | |
| 7,204,196 B2 | 4/2007 | Coles | |
| 7,207,851 B1 | 4/2007 | Gibbs et al. | |
| 7,211,983 B2 | 5/2007 | Queveau et | |
| 7,214,112 B2 * | 5/2007 | Gibbs | 440/12.51 |
| 7,234,982 B2 | 6/2007 | Longdill et al. | |

(Continued)

*Primary Examiner* — Edwin Swinehart
(74) *Attorney, Agent, or Firm* — Kenneth L. Green

(57) ABSTRACT

An amphibious vehicle achieves a stable ride, maneuverability, and high speed. The vehicle includes a hull having a "V" center portion with outboard sponsons. The sponsons reside between the front wheel wells and the rear wheels wells for improving lift and transition to planing. Shallow tunnels begin in rear portions of the front wheel wells and taper into the sponsons to release water trapped in the wheel wells. Inward facing turning edges also reside between the front and rear wheel wells and improve in-water handling. Wheels are retractable by pneumatic cylinders in parallel with air shock absorbers and suspension cutout in the hull allow the suspension to lower through the hull. Flaps reside under suspension members and rise to cover the suspension cutouts when the wheels are retractable when the wheels are raised to reduce drag. A Morse cable couple a rack and pinion unit to a jet drive.

15 Claims, 10 Drawing Sheets

U.S. PATENT DOCUMENTS

| | | |
|---|---|---|
| 7,311,567 B2 | 12/2007 | Gibbs et al. |
| 2005/0272324 A1 | 12/2005 | Gibbs |
| 2006/0189224 A1* | 8/2006 | Longdill et al. ............. 440/12.5 |
| 2006/0219146 A1* | 10/2006 | Gibbs ....................... 114/144 R |
| 2007/0006788 A1 | 1/2007 | Lindsey |
| 2007/0167092 A1 | 7/2007 | Rees et al. |
| 2008/0026650 A1* | 1/2008 | Roycroft ..................... 440/12.5 |

* cited by examiner

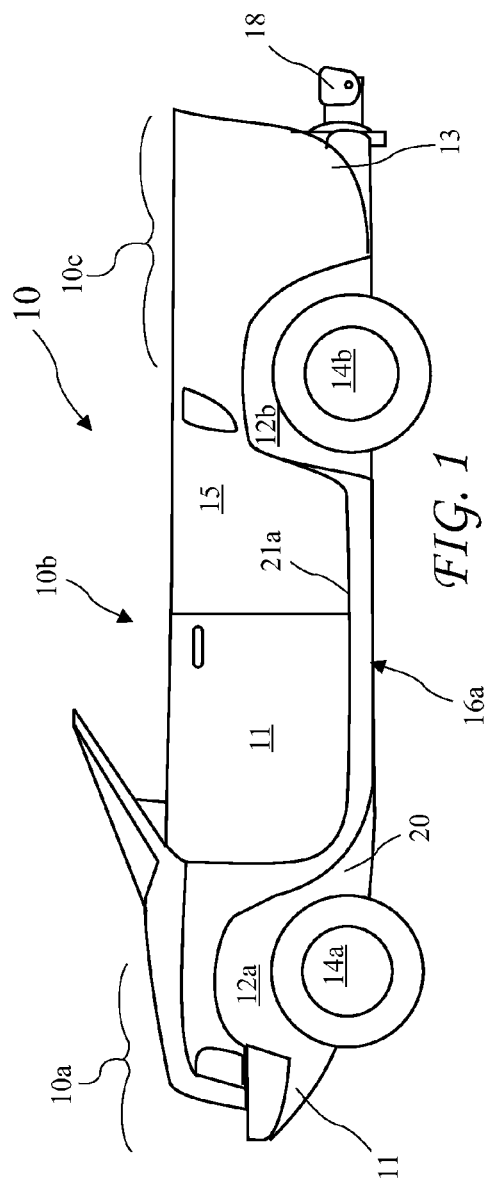
FIG. 1
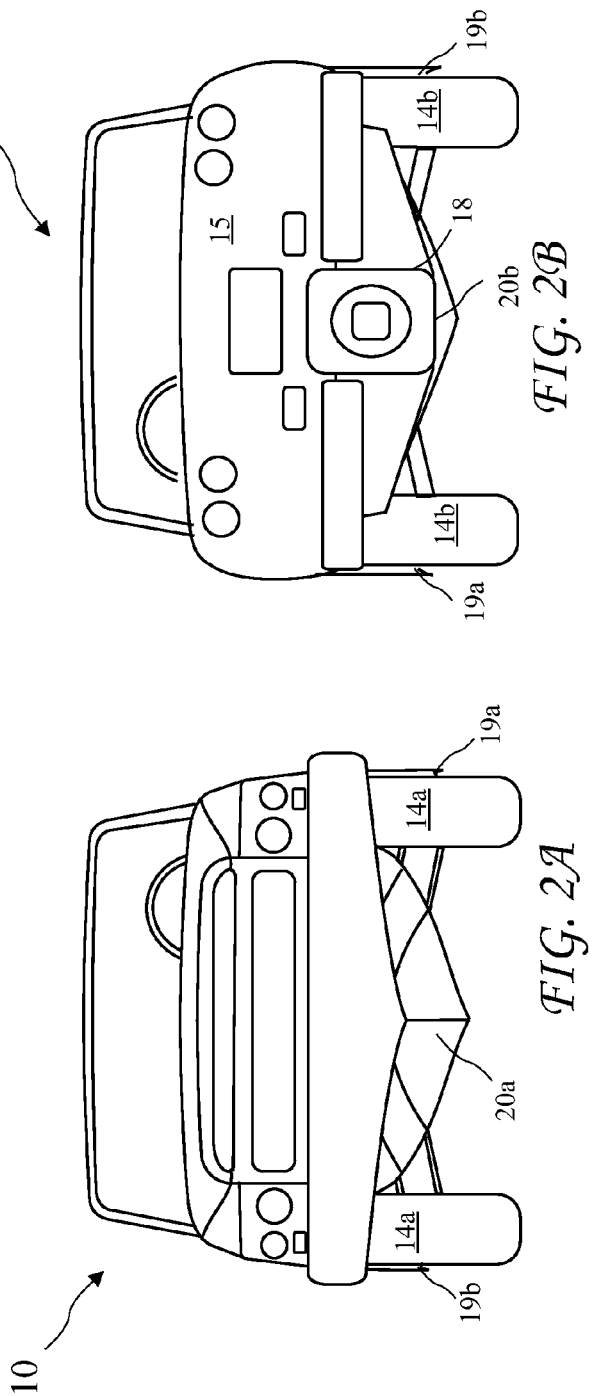
FIG. 2A
FIG. 2B

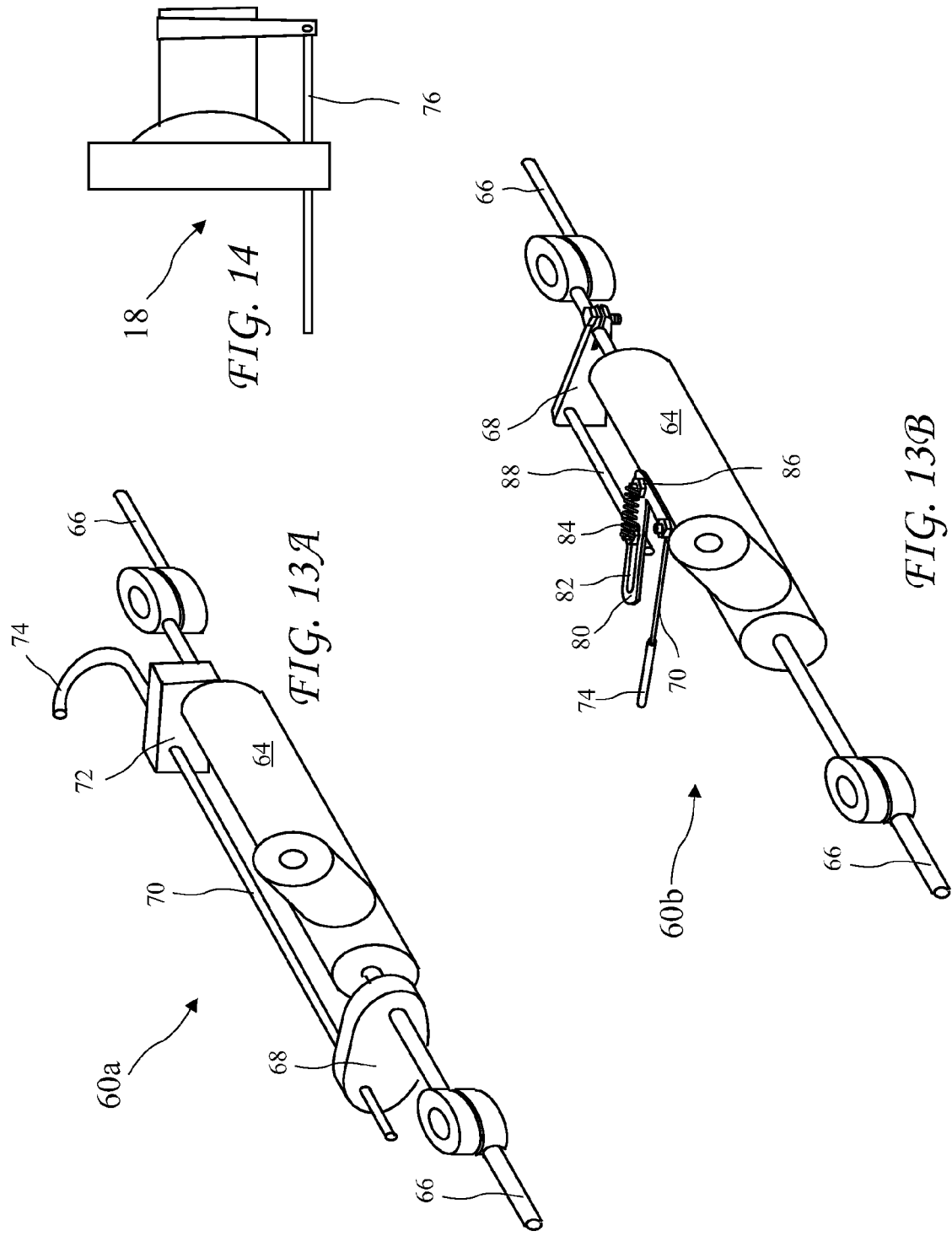

AMPHIBIOUS VEHICLE

The present application claims the priority of U.S. Provisional Patent Application Ser. No. 60/969,673 filed Sep. 3, 2007, which provisional application is incorporated in it's entirety herein by reference.

BACKGROUND OF THE INVENTION

The present invention relates to amphibious vehicles and in particular to an amphibious vehicle capable of operation in rough water and high in-water speeds.

Amphibious vehicles have been known for many years. It has been reported that only one amphibious vehicle has been made in commercial production. That amphibious vehicle was the Amphicar, which was built in Germany from 1961 to 1968. This vehicle had a top speed of only 7 mph in water. The Amphicar, was driven in the water by a pair of propellers.

In June 2004, a Gibbs Aquada set a record for crossing the English Channel by averaging over 13 miles per hour and having a top speed of approximately 30 miles per hour.

Another amphibious vehicle, the Watercar disclosed in U.S. Pat. No. 6,808,430 filed by the present applicant, achieves in-water speeds of approximately 45 miles per hour. The Watercar has a frame which supports a body which has a buoyant hull portion. The Watercar suspension includes coil over shock absorbers and the top mounting points of the coil over shock absorbers are mounted to cylinders allowing the front and rear wheels to be retracted (raised) by lifting the coil over shock mounting points. A water jet pump assembly is supported in the body and has a water intake in the bottom of the hull portion. An impeller moves water rearwardly to a water outlet jet at the stern of the hull portion of the vehicle. An engine is supported by the frame and is mounted over the water jet pump assembly. The engine drives both the wheels and the water jet pump selectively through a power transfer assembly. The frame of the Watercar has two longitudinal frame members joined near the bow by a bridge frame supporting the front wheel controls, and at the rear by a rear bridge frame extending upwardly and connected by a cross member. Port and starboard front and rear wheel bottom plates extend from a recessed position to an extended position where they slide under the raised wheels. The in-water character of the Watercar is basically that of a flat bottom boat without a scag. A scag was not included because of road clearance during on-land use, and the cost and difficulty of including a deployable scag. As a result of the absence of the scag, the Watercar does not turn as well as it might had it included a scag and flat bottom boats generally have a poor ride in rough water. Further, some features of the Watercar are expensive to manufacture and results in a fairly expensive product. The '430 patent is herein incorporated in it's entirety by reference.

BRIEF SUMMARY OF THE INVENTION

The present invention addresses the above and other needs by providing an amphibious vehicle which achieves a stable ride, maneuverability, and high speed. The vehicle includes a hull having a "V" center portion with outboard sponsons. The sponsons reside between the front wheel wells and the rear wheels wells for improving lift and transition to planing. Shallow tunnels begin in rear portions of the front wheel wells and taper into the sponsons to release water trapped in the wheel wells. Inward facing turning edges also reside between the front and rear wheel wells and improve in-water handling. Wheels are retractable by pneumatic cylinders in parallel with air shock absorbers and suspension cutout in the hull allow the suspension to lower through the hull. Flaps reside under suspension members and rise to cover the suspension cutouts when the wheels are retracted to reduce drag. A Morse cable couples a rack and pinion unit to a jet drive.

In accordance with one aspect of the invention, there is provided an amphibious vehicle comprising a frame, two front wheels supported by the frame, two rear wheels supported by the frame, a hull carrying the frame, a body carried above the hull, a power plant providing power, a jet drive, and a drive mechanism. The hull includes a bow, a stern, a bow portion extending from the bow to the at least one front wheel, a mid portion between the at least one front wheel and the rear wheels, a stern portion extending form the rear wheels to the stern, a "V" shaped longitudinal center portion extending along a centerline of the hull from the bow to the stern, and sponsons extending along outside edges of the hull between the at least one front wheel and the rear wheels. The jet drive receives power from the power plant and resides inside the hull at the stern of the hull for providing in-water propulsion. The drive mechanism receives power from the power plant for driving the rear wheels for providing on-land propulsion. Front wheel wells are provided for the front wheels and rear wheel wells for the rear wheels and both the front and rear wheel wells are formed in the hull and/or the body. Port and starboard tunnels sweep downward and sternward behind each front wheel well and taper shallower towards the port and starboard rear wheel wells respectively for providing a smooth path for water caught in the front wheel wells to escape.

In accordance with another aspect of the invention, there is provided an amphibious vehicle comprising a frame, two front wheels supported by the frame, two rear wheels supported by the frame, a hull carrying the frame, a body carried above the hull, a power plant providing power, a jet drive, and a drive mechanism. The hull includes a bow, a stern, a bow portion extending from the bow to the at least one front wheel, a mid portion between the at least one front wheel and the rear wheels, a stern portion extending form the rear wheels to the stern, a "V" shaped longitudinal center portion extending along a centerline of the hull from the bow to the stern, and sponsons extending along outside edges of the hull between the at least one front wheel and the rear wheels. The jet drive receives power from the power plant and resides inside the hull at the stern of the hull for providing in-water propulsion. The drive mechanism receives power from the power plant for driving the rear wheels for providing on-land propulsion. Front wheel wells are provided for the two front wheels and rear wheel wells for the rear wheels, both the front and rear wheel wells formed in the hull and/or the body. Port and starboard, front and rear suspension cutouts are formed in the hull bottom vertically aligned with the port and starboard front and rear suspension respectively.

The front and rear suspension is lowerable to the lowered positions through the suspension cutouts when the wheels are extended for on-road driving, and the control arms raisable to the raised positions above the suspension cutouts then the wheels are retracted for in-water driving. Port and starboard front and rear flaps are vertically aligned with the suspension cutouts. The flaps reside planar to the bottom of the hull when the control arms are in the raised positions for smoothing at least a portion of the suspension cutouts with the hull, and the flaps are lowerable to vertically separate from the bottom of the hull to allow the suspension control arms to assume the lowered positions. The combination of cutouts and flaps is important because the cutouts allow greater wheel lowering and thus greater ground clearance to allow a "V" hull for on-road operation. The flaps reduce the drag which would otherwise result from the cutouts and the rear flaps in particular reduce drag near the stern to facilitate the transition to planing.

In accordance with yet another aspect of the invention, there is provided an amphibious vehicle comprising a frame, two front wheels supported by the frame, a rack and pinion steering unit for turning the front wheels for on-land steering, two rear wheels supported by the frame, a hull carrying the frame, a body carried above the hull, a power plant providing power, a jet drive, and a drive mechanism. The hull includes a bow, a stern, a bow portion extending from the bow to the at least one front wheel, a mid portion between the at least one front wheel and the rear wheels, a stern portion extending form the rear wheels to the stern, a "V" shaped longitudinal center portion extending along a centerline of the hull from the bow to the stern, and sponsons extending along outside edges of the hull between the at least one front wheel and the rear wheels. The jet drive receives power from the power plant and resides inside the hull at the stern of the hull for providing in-water propulsion. The drive mechanism receives power from the power plant for driving the rear wheels for providing on-land propulsion. A Morse cable is connected between the rack and pinion steering unit and the jet drive to turn the jet drive for in-water steering. The rack and pinion steering unit may be manual or a power rack and pinion steering unit and connection of the Morse cable to the steering arms provides a similar feel to on-land steering and to in-water steering. In a preferred embodiment, a sliding member and at least one spring allow for full lock to lock steering of the jet drive to correspond to about one half of the lock to lock steering of the front wheels. A more preferred embodiment includes a slotted bell crank which firmly holds the jet drive at a center position.

In accordance with yet another aspect of the invention, there is provided an amphibious vehicle comprising a frame, two front wheels supported by the frame, two rear wheels supported by the frame, a hull carrying the frame, a body carried above the hull, a power plant providing power, a jet drive, and a drive mechanism. The hull includes a bow, a stern, a bow portion extending from the bow to the at least one front wheel, a mid portion between the at least one front wheel and the rear wheels, a stern portion extending form the rear wheels to the stern, a "V" shaped longitudinal center portion extending along a centerline of the hull from the bow to the stern, and sponsons extending along outside edges of the hull between the at least one front wheel and the rear wheels. The jet drive receives power from the power plant and resides inside the hull at the stern of the hull for providing in-water propulsion. The drive mechanism receives power from the power plant for driving the rear wheels for providing on-land propulsion. Port and starboard, front and rear, control arms are moveably connected between the wheels and the frame inboard of the wheels for allowing vertical motion of the wheels. The control arms have control arm lowered positions for extending the wheels for on-road driving and control arm raised positions for retracting the wheels for in-water driving. Port and starboard, front and rear shock absorbers are connected between the control arms and the frame. Port and starboard cylinders are connected between the control arms and the frame in parallel with the shock absorbers for lifting the control arms to retract the wheel for in-water driving. Front and rear air bags are preferably included for supporting the frame (i.e., in place of spring). The air bags are filled with air to extend the wheels and the air is released from the air bags and pressure is applied to the air cylinders below internal pistons to retract the wheels. The front air bags are preferably air bag elements of the front shock absorbers and the rear air bags are preferably connected between the rear suspension and the frame in parallel with the rear shock absorbers.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1 is a side view of an amphibious vehicle according to the present invention.

FIG. 2A is a front view of the amphibious vehicle.

FIG. 2B is a rear view of the amphibious vehicle.

FIG. 13A shows a first embodiment of a land and water steering unit according to the present invention.

FIG. 13B shows a second embodiment of a land and water steering unit according to the present invention.

FIG. 14 shows a Morse cable attached to the jet drive.

Corresponding reference characters indicate corresponding components throughout the several views of the drawings.

DETAILED DESCRIPTION OF THE INVENTION

Figure 3:
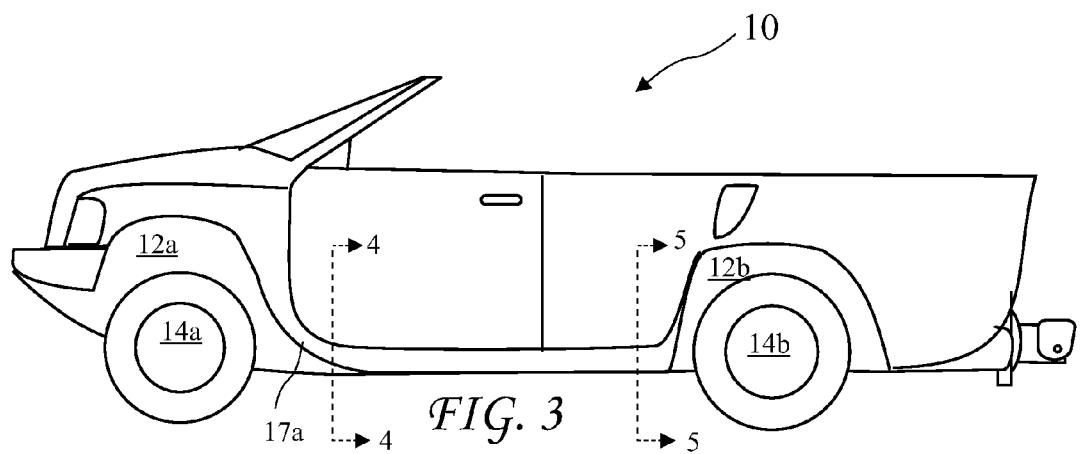
FIG. 3 is a second side view of the amphibious vehicle.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

A side view of an amphibious vehicle 10 according to the present invention is shown in FIG. 1, a front view of the amphibious vehicle 10 is shown in FIG. 2A, and a rear view of the amphibious vehicle 10 is shown in FIG. 2B. The amphibious vehicle 10 includes a body 15 having a bow portion 10a ahead of front axles 35 (see FIG. 7B), a mid portion 10b between front and rear axles 43 (see FIG. 7B), a stern portion 10c behind rear axles, a bow 11, and a stern 13. A hull 20 of the amphibious vehicle 10 resides on the bottom of the amphibious vehicle 10. The amphibious vehicle 10 is carried by front wheels 14a and rear wheels 14b for on-land driving. The front wheels 14a reside in front wheel wells 12a and the rear wheels 14b reside in stern wheel wells 12b. Port and starboard sponsons 16a and 16b (also see FIGS. 4, 5, and 10B) reside on lower outboard port and starboard sides of the amphibious vehicle 10 between the front and rear wheel wells 12a and 12b, and a jet drive 18 resides at the stern of the amphibious vehicle 10 to provide in-water propulsion.

The hull 20 includes a "V" shaped longitudinal center portion 20a providing a better in-water ride in rough water and a narrow flat center most portion 20b towards the rear of the hull 20. Unlike boat hulls, the hull 20 includes two bow wheel wells 12a and two stern wheel wells 12b interrupting the bottom surface of the hull 20. The presence of the four wheel wells 12a and 12b both creates drag and reduces lift. Such drag and loss of lift affects a vehicle at moderate speeds when the vehicle is attempting to plane and a large portion of the hull is still wet. The sponsons 16a and 16b overcome these difficulties by providing additional surface (or lifting) area in the center portion 10b of the hull 20 of the amphibious vehicle 10, which center portion 10b is wet at moderate speed providing lift. The wet area shifts back towards the stern of the hull 20 as speed increases, and planing at high speed does not require substantial lift from the sponsons 16a and 16b, although aft ends of the sponsons 16a and 16b generally remain wet during high speed planing to provide improved stability.

The design of the sponsons is a balance between drag and lift and an optimal design is dependent on the length and design of the hull, and the weight and balance of the amphibious vehicle. A greater wet area improves lift, but also adds some to drag. Maintaining at least a small rear portion of the sponsons in the water at high speed improves stability. Generally, the depth of the sponson $D_S$ relative to the depth of the hull $D_H$ (see FIG. 4A) has the greatest affect on sponson hydrodynamics. The sponson design goal is to make the depth of the sponson $D_S$ great enough to obtain lift at moderate speed and stability at high speed. The exact design to accomplish this goal for a specific hull design may require in-water testing.

Figure 4:
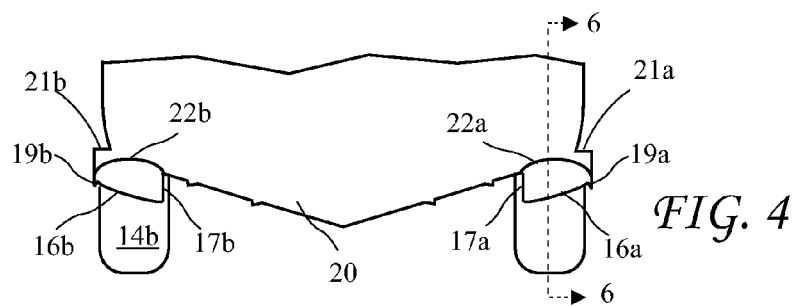
FIG. 4 is a cross-sectional view of the amphibious vehicle taken along line 4-4 of FIG. 3.
Figure 5:
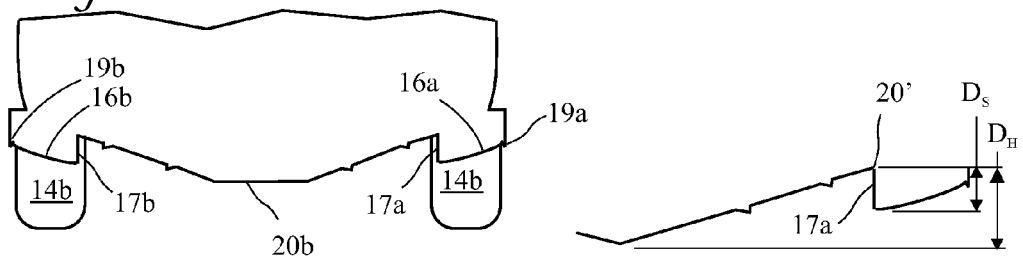
FIG. 5 is a cross-sectional view of the amphibious vehicle taken along line 5-5 of FIG. 3.
Figure 6:
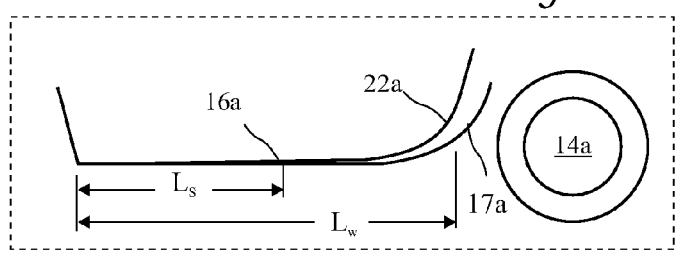
FIG. 6 is a cross-sectional view of a port side leading edge flaring into a sponson according to the present invention, residing behind a front port side wheel taken along line 6-6 of FIG. 4.

A second side view of the amphibious vehicle 10 is shown in FIG. 3, a cross-sectional view of the amphibious vehicle 10 taken along line 4-4 of FIG. 3 is shown in FIG. 4, a cross-sectional view of the amphibious vehicle 10 taken along line 5-5 of FIG. 3 is shown in FIG. 5, and cross-sectional view of a leading edge 22a, according to the present invention, of the sponson 16a taken along line 6-6 of FIG. 4 is shown in FIG. 6. Port and starboard leading edges 22a and 22b reside between the port and starboard front wells 12a and 12b and the port and starboard sponsons 16a and 16b on each side of the "V" shaped longitudinal center portion 20a of the hull 20. The port and starboard leading edges 22a and 22b sweep downward and sternward just behind the port and starboard front wheel wells 12a and 12b respectively and merge into the port and starboard sponsons 16a and 16b respectively for providing a smooth path for water caught in the front wheel wells 12a and 12b to escape to improve in-water lift and stability. The length of the sponsons $L_S$, measured from the transition of the leading edges 22a and 22b to the sponsons 16a and 16, is preferably between one half and two thirds of the length between the wheel wells $L_W$, and is more preferably approximately two thirds of the length between the wheel wells $L_W$.

Figure 4A:
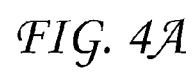

Inward facing port and starboard turning edges 17a and 17b preferably form inside edges of the sponsons 16a and 16b respectively. The turning edges 17a and 17b provide the important function of catching the water when the amphibious vehicle 10 is turned in the water, thus improving in-water responsiveness. The turning edges 17a and 17b are preferably between inside and outside edges of the wheel wells 12a and 12b, and are more preferably aligned with inside edges of the wheel wells 12a and 12b (see FIG. 10B). The turning edges 17a and 17b are preferably vertical edges, but may be sloped, and preferably extend down a sponson depth $D_S$ between 25 percent and 75 percent of a hull (or "V") depth $D_H$ below a highest point 20' of the hull seen in the cross-sectional view of FIG. 4A, and more preferably extend down the sponson depth $D_S$ of approximately 50 percent of the hull depth $D_H$ measured from the base of the turning edges 17a and 17b. In the embodiment of FIG. 4A, the cutting edge 17A had a cutting edge height equivalent to the sponson depth $D_S$.

While sponsons with an inside edge formed by the turning edges and sloping outward and upward from the turning edges (see FIGS. 4 and 5) are preferred, any amphibious vehicle with hydrodynamic surfaces between the wheel wells providing lift at low and moderate speeds is intended to come within the scope of the present invention. any combination of turning edge and sponson between the wheel wells providing improved turning (the turning edges) and improved lift at low and moderate speeds (the sponsons) is intended to come within the scope of the present invention. For example, the turning edges may be at the outside edge of the sponsons (i.e., aligned with the outside edges of the wheel wells) and the sponsons may slope upward and outward to the turning edges. Further, when the turning edges are on the inside edge of the sponsons, the sponsons may have a flat nearly horizontal bottom, not rising or lowering.

Port and starboard negative chines 19a and 19b run along outside edges of the sponsons 16a and 16b between the front and rear wheel wells 12a and 12b. The chines 19a and 19b reach outward and downward and reduce or eliminate water splashing into the amphibious vehicle 10 interior.

Figure 7A:
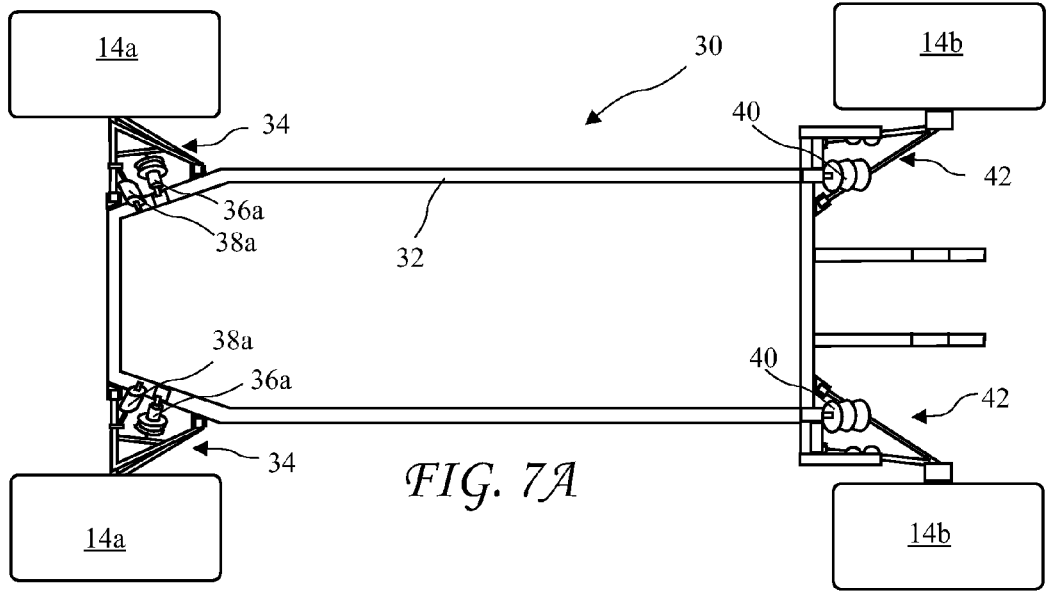
FIG. 7A is a top view of an amphibious vehicle frame and suspension according to the present invention.
Figure 7B:
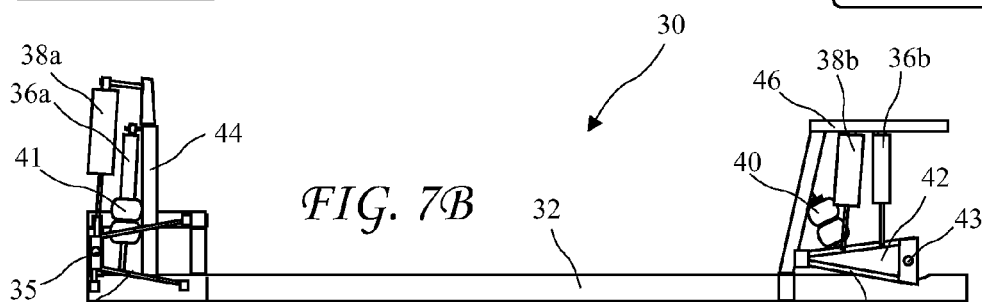
FIG. 7B is a side view of the amphibious vehicle frame and suspension.
Figure 7C:
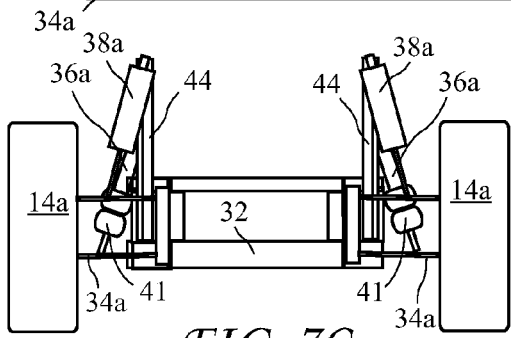
FIG. 7C is a front view of the amphibious vehicle frame and suspension.
Figure 7D:
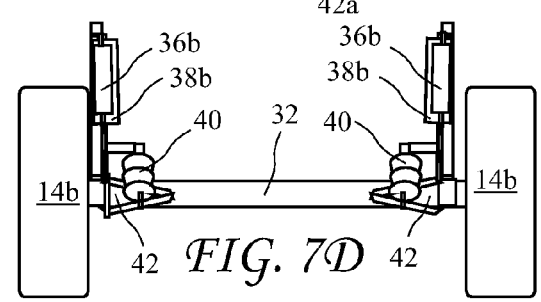
FIG. 7D is a rear view of the amphibious vehicle frame and suspension.

A top view of an amphibious vehicle frame 30, front suspension control arms 34, and rear suspension control arms 42 according to the present invention is shown in FIG. 7A, a side view of the amphibious vehicle frame and suspension is shown in FIG. 7B, a front view of the amphibious vehicle frame and suspension is shown in FIG. 7C, and a rear view of the amphibious vehicle frame and suspension is shown in FIG. 7D. The front suspension control arms 34 preferably comprise upper and lower lateral control arms (i.e., extending laterally between the front wheels 14a and the frame 30) connecting the front wheels 14a to the frame 30 to allow normal suspension motion for on-road driving and for allowing the front wheels 14a to be retracted for in-water driving. Front axles 35 are carried by the front control arms 34.

While the embodiment described herein includes upper and lower front control arm and trailing arm rear suspension, such is merely a single embodiment of the present invention. Other embodiments may include trailing arm front suspension, A arm rear suspension, or McPherson struts at the front and/or rear. An amphibious vehicle including sponsons, turning edges, flaps for covering suspension openings, or steering according to the present invention is intended to come within the scope of the present invention regardless of the type of suspension used for on-road driving.

The rear suspension control arms 42 preferably comprise trailing control arms 42 connected between the frame 30 and the rear wheels 14b. The trailing control arms pivot at a forward mounting point to allow normal suspension motion for on-road driving and for allowing the rear wheels 14b to be retracted for in-water driving. Rear axles 43 are carried by the rear suspension 42.

Continuing with FIGS. 7A-7D, front shock absorbers 36a are connected between the suspension control arms 34 and the frame 30 to damping motion of the front wheels 14a. Front cylinders 38a are mounted in parallel with the front shock absorbers 36a and are connected to a pressure source so that when pressure is applied to bases of the cylinders 38a (i.e., below pistons in the cylinders 38a), the front wheels 14a are retracted for in-water driving. Similarly, rear shock absorbers 36b are connected between the rear suspension control arms 42 and the frame 30 to damping motion of the rear wheels 14b. Rear cylinders 38b are mounted in parallel with the rear shock absorbers 36b and are connected to the pressure source so that when pressure is applied to bases of the cylinders 38b (i.e., below pistons in the cylinders 38b), the rear wheels 14b are retracted for in-water driving. Both the front shock absorbers 36a and cylinders 38a are preferably connected between the control arms and towers 44. The towers 44 are preferably molded into the body for added strength and to seal the wheel wells to keep water out of the interior and engine compartment.

Figure 7E:
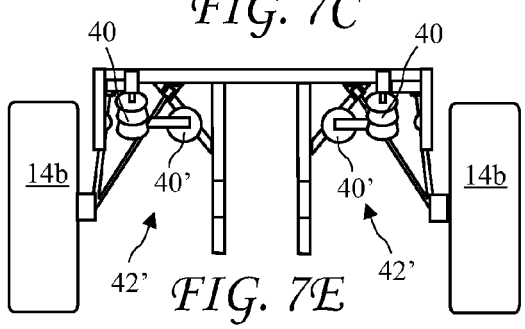
FIG. 7E is a top view of a second embodiment of the rear suspension.
Figure 7F:
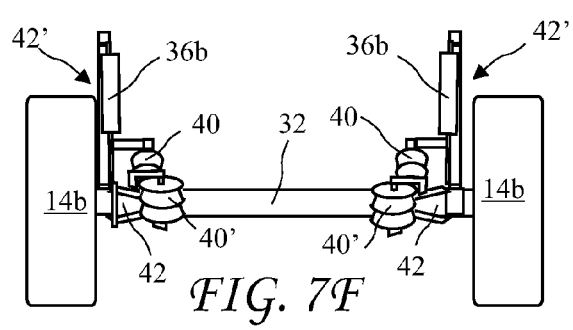
FIG. 7F is a rear view of the second embodiment of the rear suspension.

A top view of a second embodiment of the rear suspension 42' is shown in FIG. 7E, and a rear view of the second embodiment of the rear suspension 42' is shown in FIG. 7F. The rear suspension 42' replaces the rear lifting cylinders 38b with second rear air bags 40'. The air bags 40' are attached to the frame through a bracket at the air bag bottom, and to the rear suspension at the air bag top. When the air bags 40' are inflated, the rear suspension 42' is raised.

Figure 8A:
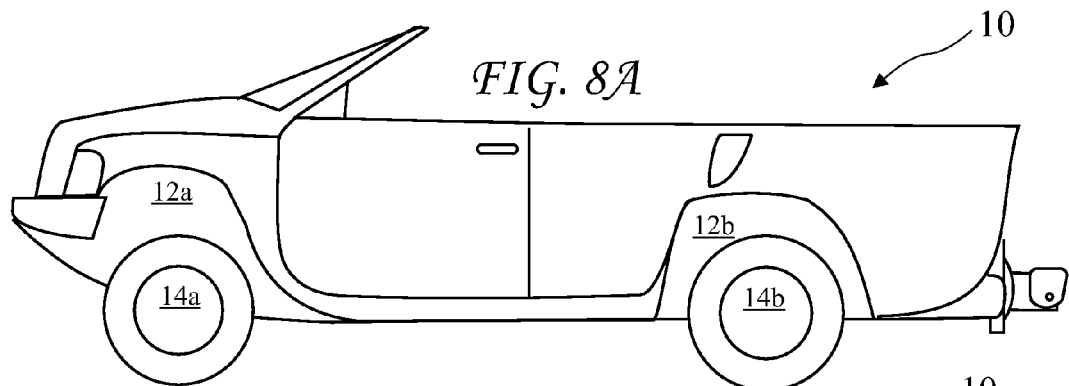
FIG. 8A is a side view of the amphibious vehicle with the wheels extended for on-road driving.
Figure 8B:
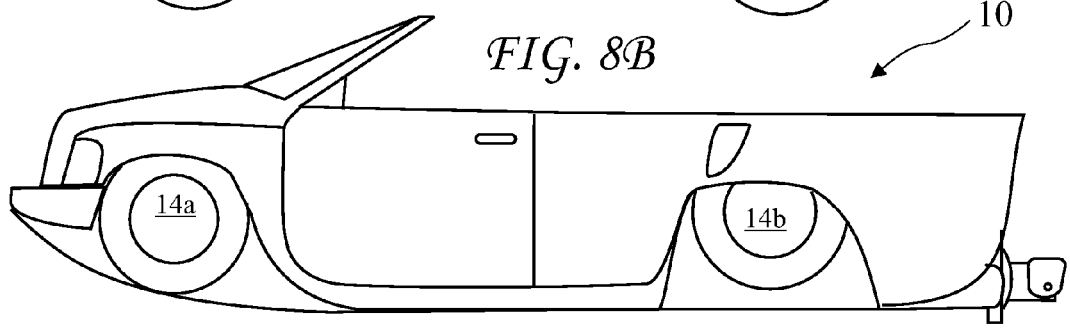
FIG. 8B is a side view of the amphibious vehicle with the wheels retracted for in-water driving.
Figure 9A:
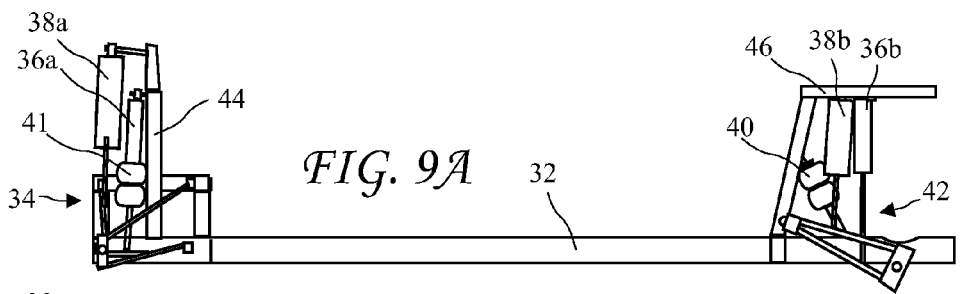
FIG. 9A is a side view of the amphibious vehicle frame with suspension lowered to extend the wheels for on-road driving.
Figure 9B:
FIG. 9B is a side view of the amphibious vehicle frame with the suspension raised to retract the wheels for in-water driving.

A side view of the amphibious vehicle 10 with the wheels 14a and 14b extended for on-road driving is shown in FIG. 8A, a side view of the amphibious vehicle 10 with the wheels 14a and 14b retracted for in-water driving is shown in FIG. 8B, a side view of the amphibious vehicle frame 30 with suspension control arms 34 and 42 lowered to extend the wheels 14a and 14b for on-road driving is shown in FIG. 9A, and a side view of the amphibious vehicle frame 30 with the control arms raised to retract the wheels 14a and 14b for in-water driving is shown in FIG. 9B. Preferably, air bags 41 and 40 are included to support the amphibious vehicle 10, in place of more common springs. More preferably, the front shock absorbers 36a are air shock absorbers and most preferably the front shock absorbers include air bags 41 serially integrated into the front shock absorbers. More preferably, the rear suspension includes rear air bags 40 mounted in parallel with the rear shock absorbers 36b and cylinders 38b. Such preferred arrangement of air bags 40 and 41 and cylinders 38a and 38b allows a simple and low cost extending (by removing the pressure from the cylinders and providing pressure to the air bags) of the wheels 14a and 14b, and retracting (by providing the pressure from the cylinders and removing the pressure to the air bags) of the wheels 14a and 14b.

Figure 9C:
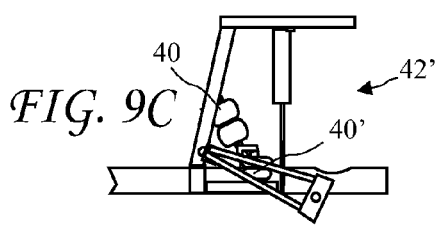
FIG. 9C is a side view of the amphibious vehicle frame with the second embodiment of the rear suspension lowered to extend the wheels for on-road driving.
Figure 9D:
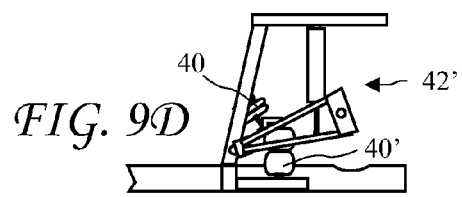
FIG. 9D is a side view of the amphibious vehicle frame with the second embodiment of the rear suspension raised to lift the wheels for in-water driving.

A side view of the amphibious vehicle frame with the second embodiment of the rear suspension 42' lowered to extend the wheels for on-road driving is shown in FIG. 9C, and a side view of the amphibious vehicle frame with the second embodiment of the rear suspension 42' raised to lift the wheels for in-water driving is shown in FIG. 9D. The air bags 40' replace the cylinders 38b and are attached to the frame through brackets at the air bag bottom, and to the rear suspension at the air bag top. When the air bag 40' are inflated, the rear suspension 42' is raised.

Figure 10A:
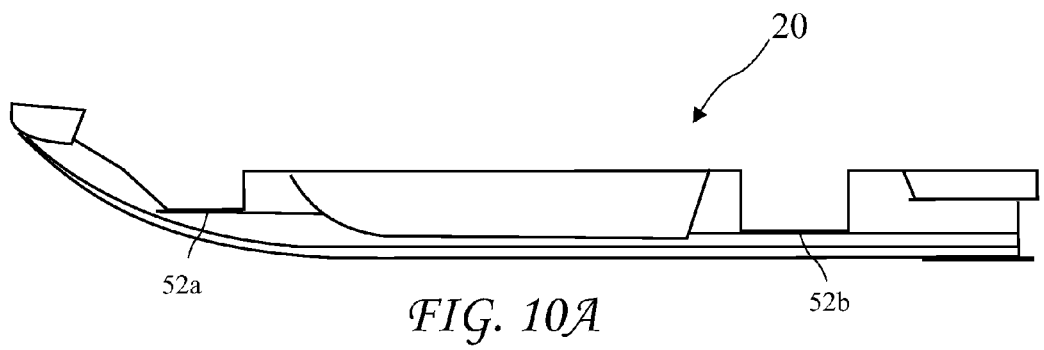
FIG. 10A is a side view of a hull according to the present invention with flap according to the present invention laying against the bottom of the hull.
Figure 10B:
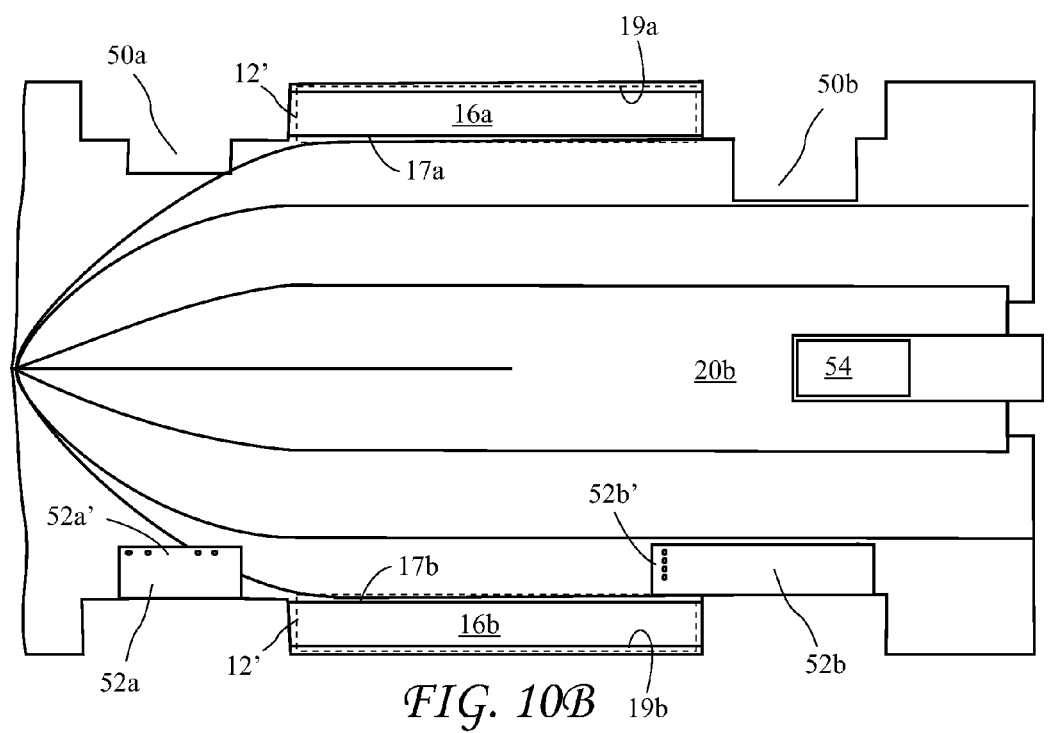
FIG. 10B is a bottom view of the hull showing control arm cutouts and the flaps covering the cutouts to smooth the cutouts with the bottom of the hull.
Figure 10C:
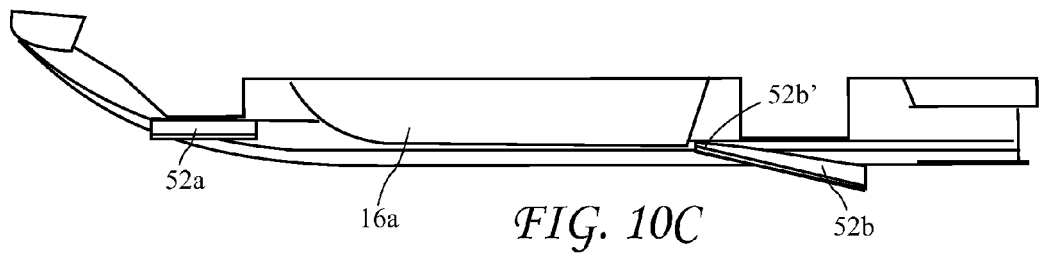
FIG. 10C is a side view of the hull showing the flaps vertically separated from the hull to allow the control arms to move to a lowered control arm position for on-road driving.

A side view of the hull 20 according to the present invention with port front flap 52a and port and rear flap 52b according to the present invention laying against the bottom of the hull 20 is shown in FIG. 10A, a bottom view of the hull 20 showing port front and rear control arm cutouts 50a and 50b and starboard front flap 52a and starboard rear flap 52b covering starboard front cutout 50a and starboard rear cutout 50b respectively (not shown), to smooth the cutouts 50a and 50b with the bottom of the hull 20, is shown in FIG. 10B, and a side view of the hull 20 showing the flaps 52a and 52b vertically separating from the hull 20 to allow the control arms 34 and 42 (see FIG. 7A-7D), to move to a lowered control arm position for on-road driving, is shown in FIG. 10C. The two front flaps 52a and the two rear flaps 52b cover control arm cutouts 50a and 50b respectively when the suspension is raised for in-water operation to reduce drag, allowing easier transition to planing. A water inlet 54 for the jet drive 18 resides laterally centered on the flat center most bottom portion 20b of the hull 20 near the stern 13. The sponsons 16a and 16b are seen to reside in outside portions of the hull 12' between the wheel wells 12a and 12b.

Figure 11A:
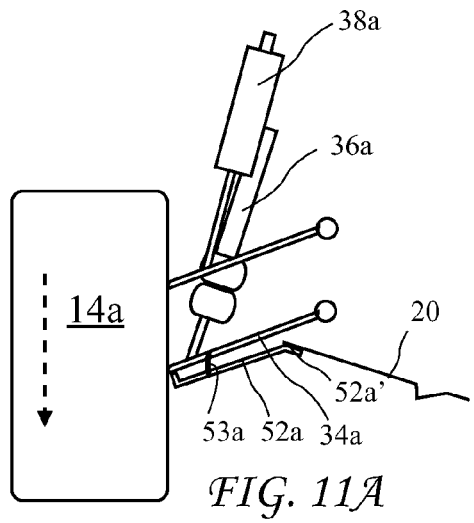
FIG. 11A shows front control arms lowered and pushing front flaps down according to the present invention.
Figure 11B:
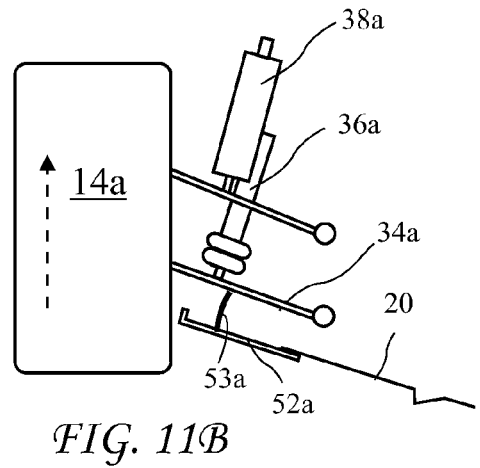
FIG. 11B shows front control arms raised and pulling front flaps up against the hull according to the present invention.

A front view of the front suspension in a lowered position with the flap 52a pushed down by the lower control arm 34a is shown in FIG. 11A and a front view of the front suspension in a raised position with the flap 52a pulled up by a strap 53a attached to the lower control arm 34a is shown in FIG. 11B (also see FIGS. 10A-10C). The flap 52a is attached to the hull 20 along an inside edge 52a' and moves downward when the suspension is lowered (see FIG. 11A). The strap 53a is preferably an elastic strap and allows for some freedom on tolerances. When the flaps 52a are raised, water is kept out of the front wheel suspension cutouts 50a reducing the potential for increased drag. The flaps 52a include vertical edge on the outside edge of the flap 52a to reduce the entry of water into the suspension cutout 50a. The vertical edge may be from one to three inches high and vary along the length of the flap.

Figure 12A:
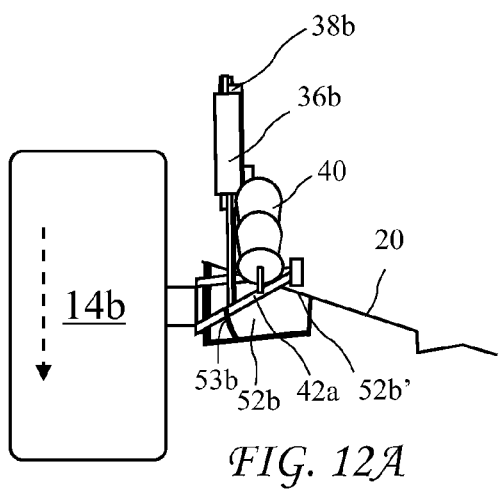
FIG. 12A shows the rear suspension lowered and pushing rear flaps down according to the present invention.
Figure 12B:
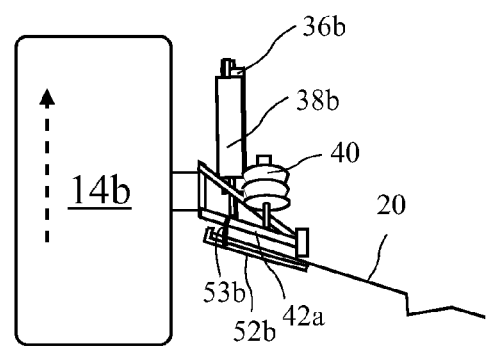
FIG. 12B shows the rear suspension raised and pulling the rear flaps up against the hull according to the present invention.

A rear view of the rear suspension in a lowered position with the flap 52b pushed down by the lower control arm 42a is shown in FIG. 12A and a front view of the rear suspension in a raised position with the flap 52b pulled up by a rear strap 53b attached to the lower control arm 42a is shown in FIG. 12B. The flap 52b is attached to the hull 20 along a forward edge 52b' and moves downward when the suspension is lowered (see FIG. 10C). The strap 53b is preferably not elastic (for example, is a cable or chain) and holds the flap 52b firmly against the hull 20 during in-water operation (also see FIGS. 10A-10C). The rear flaps 52b generally experience much greater water forces than the front flaps 52a, and holding the rear flaps tightly against the bottom of the hull 20 is very important in reducing drag. The flaps 52b also have about a one inch vertical edge on the outside edge of the flap 52b to reduce the entry of water into the suspension cutout 50b.

Figure 12C:
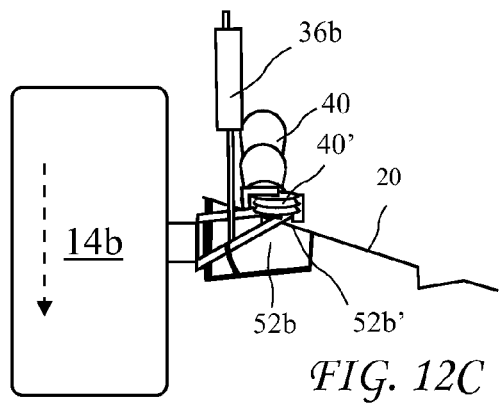
FIG. 12C shows the second embodiment of the rear suspension lowered and pushing the rear flaps down according to the present invention.
Figure 12D:
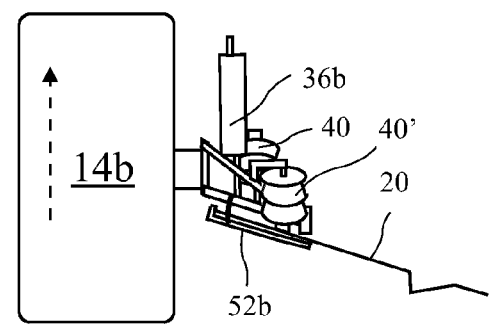
FIG. 12D shows the second embodiment of the rear suspension raised and pulling the rear flaps up against the hull according to the present invention.

The second embodiment of the rear suspension 42' lowered and pushing the rear flaps 52b down is shown in FIG. 12C, and the rear suspension 42' raised and pulling rear flaps 52b up against the hull according to the present invention is shown in FIG. 12D. The air bags 40 are seen inflated to support the amphibious vehicle 10 during on road operation is seen in FIG. 12C, and the air bags 40' are shown inflated to lift the suspension 42' for in-water operation is seen in FIG. 12D.

A first embodiment of a land and water steering unit 60a, according to the present invention, having a Morse cable 74 connected to a rack and pinion unit 64 is shown in FIG. 13A. The connection of the Morse cable to the jet drive 18 through a rod 76 is shown in FIG. 14. A sliding inner cable 70 is connected to steering arms 66 which are connected to the front wheels 14a (see FIG. 1) for on-land steering. The cable 70 is connected to a rod 76 connected to the nozzle of the jet drive 18 to steer in-water. The rack and pinion unit 60 may be a power rack and pinion steering unit or a manual rack and pinion steering unit. Such a direct cable connection between the steering arms 66 and the jet drive 18 provides a similar feel to on-land and in-water steering thus making the transition between in-water and on-land more natural.

Figure 15A:
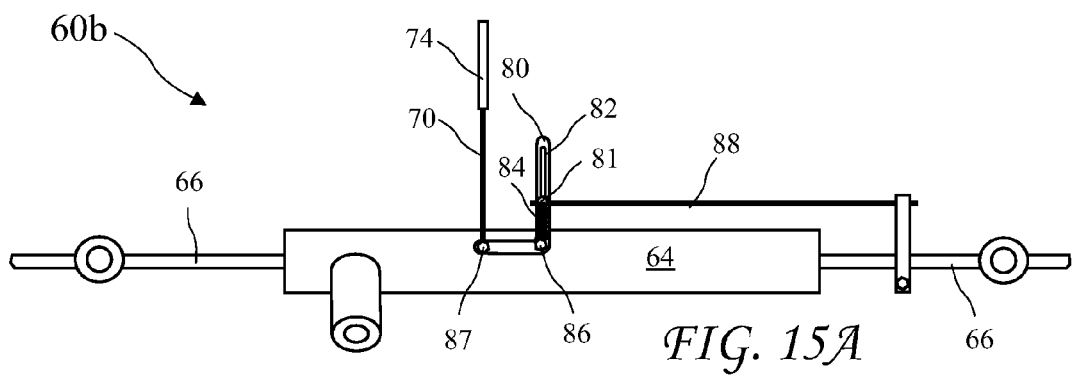
FIG. 15A shows a top view of the second embodiment of a land and water steering unit in a centered position.
Figure 15B:
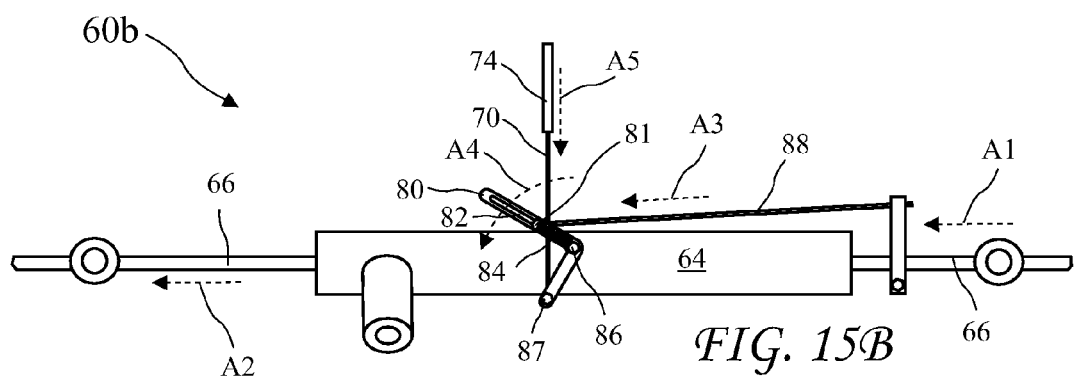
FIG. 15B shows a top view of the second embodiment of a land and water steering unit in a partial left turn position.
Figure 15C:
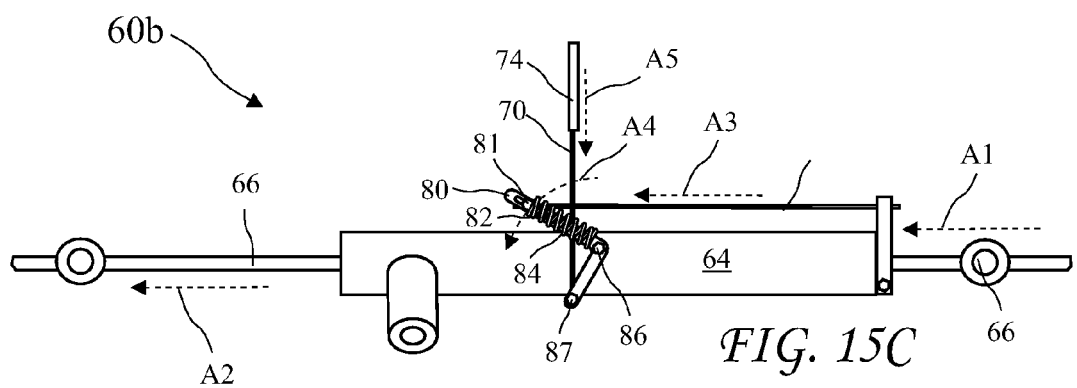
FIG. 15C shows a top view of the second embodiment of a land and water steering unit in a full left turn position.

A perspective view of a second embodiment of a land and water steering unit 60b, according to the present invention, with the Morse cable 74 connected to the rack and pinion steering unit 64 is shown in FIG. 13B and top views of the second embodiment of a land and water steering unit 60b in different positions are shown in FIGS. 15A-15C. In order to have the same land and water steering feel, some drivers prefer that the water steering is quicker than the land steering and with less turn lock to lock. To obtain such results, the land and water steering unit 60b including a spring 84 and slot 82 mechanism shown in FIG. 13A in a centered position. A rod 88 is connected to one of the steering arms 66 and translates with the steering arm 66 along arrow A1 (arrow A2 shows the same translation of the opposite steering arm 66). The opposite end of the rod 88 is attached to a sliding member 81 which slides in a slot 82 in a coupling device comprising an "L" shaped bell crank 80. The bell crank 80 pivots at pivot 86 in the corner of the crank. A spring 84 is in tension between the pivot 86 and the sliding member 81 thereby pulling the sliding member 81 towards the pivot 86. An inner Morse cable 70 attached to a cable end 87 of the bell crank 80 and motion of the steering arm 66 is thus translated into a motion of the inner Morse cable 70. Preferably, the first approximately three inches of rack movement is directly translated to three inches of translation of the inner Morse cable. Additional motion of the rack is transmitted only to the front wheels.

While a land and water steering unit with an "L" shaped bell crank is disclosed above, any coupling device providing for a sliding member to couple initial movement of the steering arm away from center with a Morse cable, and to decouple further movement of the steering arm from the Morse cable is intended to come within the scope of the present invention.

A preferred steering ratio for on-land steering is between 2:1 and 3:1, and a more preferred ratio is approximately 3:1. A preferred steering ratio for in-water steering is between 1.5:1 and 2.5:1, and a more preferred ratio is approximately 1.5:1. The on-land steering is preferably 3 turns lock to lock, and the in-water steering is preferably 1.5 turns lock to lock.

Initial translation of the steering arms 66 along arrows A1 and A2 is shown in FIG. 15B. The translation of the steering arms 66 results in a similar translation along arrow A3 of the rod 88. The spring 84 holds the sliding member 84 at the end of the slot 82 nearest to the pivot 86, and the translation of the rod 88 causes the bell crank 80 to rotate along arrow A4. The rotation of the bell crank 80 causes translation along arrow A5 of the inner Morse cable 70. The inner Morse cable 70 is attached to the rod 76 (see FIG. 14). Turning the steering wheel thus causes both turning of the front wheel for land steering and turning of the jet drive 18 (see FIG. 12).

Full motion of the steering arm 66 is shown in FIG. 15C. The bell crank 80 is prevented by stops from further rotation past the rotation shown in FIG. 15B, and the spring 84 is stretched allowing the sliding member 84 to slide to the end of the slot 82 farthest from the pivot 86, and there is no additional translation by the inner Morse cable 70 past the translation shown in FIG. 15B. Thus full motion of the jet drive 18 is obtained during an initial translation of the steering arm 66.

Figure 16A:
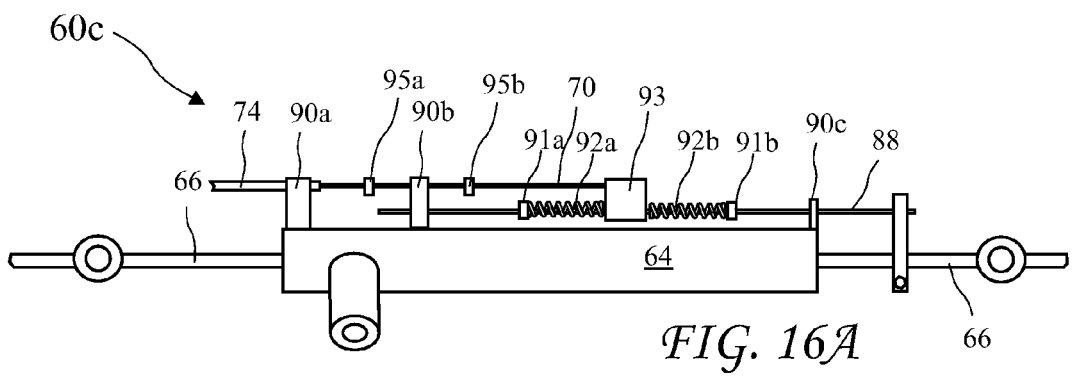
FIG. 16A shows a top view of the third embodiment of a land and water steering unit in a centered position.
Figure 16B:
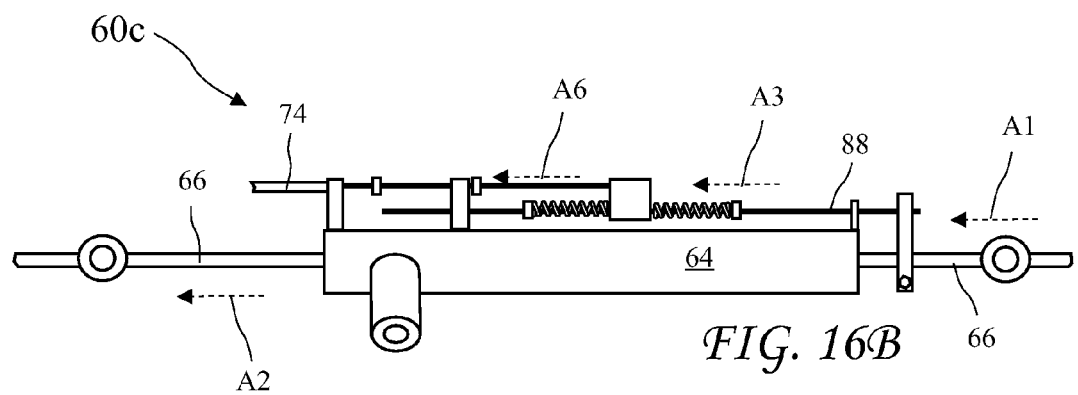
FIG. 16B shows a top view of the third embodiment of a land and water steering unit in a partial left turn position.
Figure 16C:
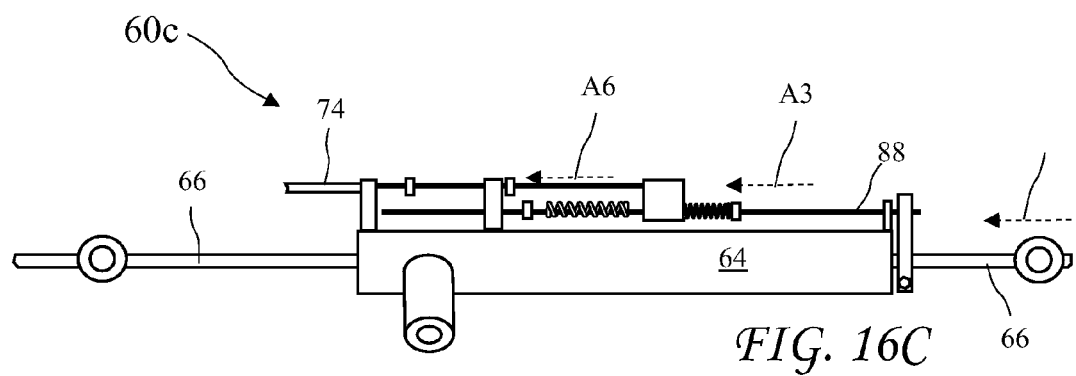
FIG. 16C shows a top view of the third embodiment of a land and water steering unit in a full left turn position.

A top view of a third embodiment of a land and water steering unit 60c, according to the present invention, with the Morse cable 74 connected to the rack and pinion steering unit 64 is shown in FIG. 16A and top views of the third embodiment of a land and water steering unit 60c in different positions are shown in FIGS. 16B and 16C. The third embodiment of a land and water steering unit 60c provides the same benefits as the second embodiment 60b, except without the bell crank 80. The rod 88 slides through a second guide 90b and a third guide 90c, both attached to the rack and pinion steering unit 64. A second sliding member 93 slides on the rod 88 and is sandwiched between springs 92a and 92b which are retained between locks 91a and 91b. The second sliding member 93 may thus slide on the rod 88, but is pushed to a center position between the locks 91a and 91b by the springs 92a and 92b. The inner Morse cable 70 is fixed to the second sliding member 93 and translates with the second sliding member 93. The inner Morse cable 70 further slides through the guide 90b and second locks 95a and 95b are attached to the inner Morse cable 70 on each side of the guide 90b to limit the translation of the inner Morse cable 70 through the guide 90b in either direction. The Morse cable 74 is held by a first guide 90a attached to the rack and pinion steering unit 64.

Initial translation of the steering arms 66 along arrows A1 and A2 is shown in FIG. 16B. The translation of the steering arms 66 results in a similar translation along arrow A3 of the rod 88. The springs 92a and 92b hold the second sliding member 93 centered between the locks 91a and 91b, and the translation of the rod 88 causes the second sliding member 93 and inner Morse cable 70 to translate along arrow A6. Turning the steering wheel thus causes both turning of the front wheel for land steering and turning of the jet drive 18 (see FIG. 14).

Full motion of the steering arm 66 is shown in FIG. 16C. The second sliding member 93 is prevented by stops 95a and 95b from further translation past the translation shown in FIG. 16B, and the spring 84 is compressed allowing the rod 88 to slide through the second sliding member 93, and there is no additional translation by the inner Morse cable 70 past the translation shown in FIG. 16B. Thus full motion of the jet drive 18 is obtained during a first translation of the steering arm 66.

While the spring and sliding members of the third embodiment of a land and water steering unit 60c are described above at the rack and pinion steering unit end of the Morse cable 74, a similar apparatus may reside at the jet drive 18 to provide the same result.

A significant advantage of the second embodiment of a land and water steering unit 60b is that in the centered position, the slot 82 and the spring 84 are perpendicular to the rod 88. While the third embodiment of a land and water steering unit 60c provides a somewhat more simple and intuitive design, the springs 92a and 92b, and the sliding direction of the sliding of the second sliding member 93 are aligned with the rod 88. As a result, the second sliding member 93 may not hold the jet drive 18 in a centered position at high speed straight running when water impacts the sides of the jet drive 18, i.e., water forces on the jet drive 18 may be sufficient to compress the springs 92a and/or 92b and somewhat turn the jet drive 18. Because neither the spring 84 nor the slot 82 of the second embodiment of a land and water steering unit 60b are aligned with the rod 88 when the steering is centered, the jet drive 18 is better held when in the center position.

Figure 17A:
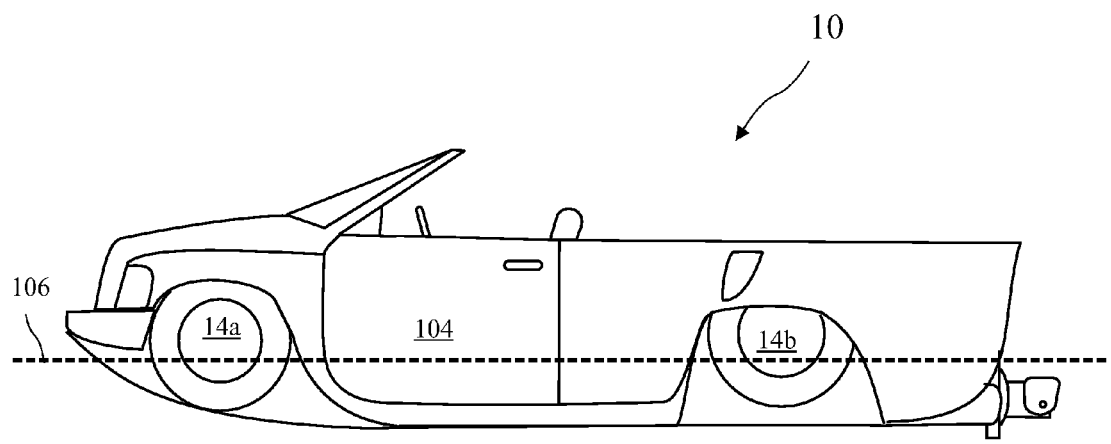
FIG. 17A shows the amphibious vehicle in-water.
Figure 17B:
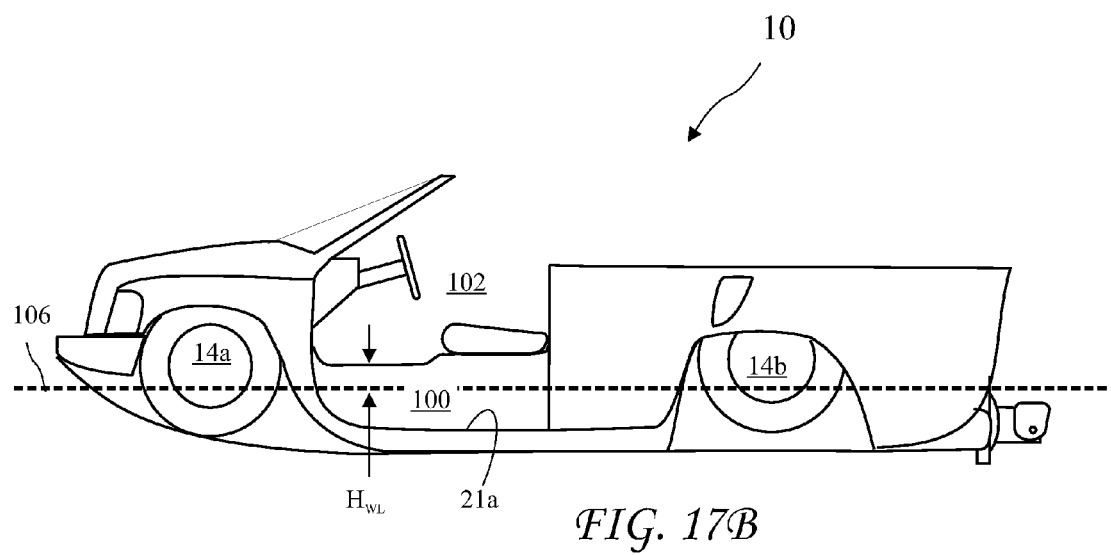
FIG. 17B shows an interior side wall according to the present invention for allowing the doors to open while in-water without allowing water to enter the amphibious vehicle.

The amphibious vehicle 10 is shown in-water with a water line 106 above the lower edge of the door 104 is shown in FIG. 17A, and an interior side wall 100 according to the present invention for allowing the doors to open while in the water is shown in FIG. 17B. The interior side wall 100 is a height $H_{WL}$ above the water line 106. The height $H_{WL}$ is preferably at least three inches and more preferably between four and six inches, and may vary due to vehicle loading. The combination of the running boards 21a and 21b and the interior side walls 100 allow the doors to be opened in-water, and, for example, a skier, to simply step onto either running board, and into the interior 102 of the amphibious vehicle 10. Further, because the interior side wall 100 prevents entry of water into the amphibious car 10 in normal operation, (i.e., not in overly rough water), the doors 104 do not require sealing.

While the invention herein disclosed has been described by means of specific embodiments and applications thereof, numerous modifications and variations could be made thereto by those skilled in the art without departing from the scope of the invention set forth in the claims.

I claim:

1. An amphibious vehicle comprising:
    a frame;
    two front wheels attached to the frame;
    port and starboard front wheel wells for the two front wheels;
    two rear wheels attached to the frame;
    port and starboard rear wheel wells for the rear wheels;
    a hull attached to the frame, the hull comprising;
        a bow;
        a stern;
        a bow portion extending between the bow and front axles of the two front wheels;
        a mid portion between the front axles and rear axles of the rear wheels;
        a stern portion extending from the rear axles to the stern;
        a "V"shaped longitudinal center portion extending along a centerline of the hull from the bow to the stern; and
        sponsons extending along outside edges of the hull between the front wheel wells and the rear wheels, the sponsons absent in front of the front wheel wells, and the right and left sponsons approximately centered on the right and left front and rear wheels respectively for providing lift during in-water operation of the amphibious vehicle, the lowest point of the "V" shaped longitudinal center portion reaching lower than the lowest point of the sponsons;
    a body carried above the hull, the front wheel wells formed in at least one of the hull and the body and the rear wheel wells formed in at least one of the hull and the body;
    a power plant providing power;
    a jet drive receiving power from the power plant and residing inside the hull at the stern of the hull for providing in-water propulsion; and
    a drive mechanism receiving power from the power plant for driving the rear wheels for providing on-land propulsion,
    wherein the "V" shaped longitudinal center portion reaches outward and upward from the centerline of the hull center portion to center portion outer edges aligned approximately with wheel inside edges of the wheels, and further including port and starboard turning edges running between the port and starboard wheel wells along the center portion outer edges of the "V" shaped longitudinal center portion, the turning edges having faces facing inward to trap water during turning to facilitate the turning.

2. The amphibious vehicle of claim 1, wherein the turning edges are on inside faces of the sponsons.

3. The amphibious vehicle of claim 2, wherein the sponsons taper upward and outward from the turning edges.

4. The amphibious vehicle of claim 1, wherein the sponsons include a downward and sternward sweeping leading edge fixedly positioned behind the front wheels and blending the port and starboard front wheel wells into the port and starboard sponsons for reducing drag.

5. The amphibious vehicle of claim 2, wherein the turning edges are approximately vertical.

6. The amphibious vehicle of claim 1, wherein the sponsons have about the same width as the wheels.

7. The amphibious vehicle of claim 1, wherein:
    the turning edges comprise vertical inside faces of the sponsons; and
    the sponsons taper monotonically upward and outward from the turning edges.

8. An amphibious vehicle comprising:
    a frame;
    at least one front wheel supported by the frame;
    port and starboard rear wheels supported by the frame;
    port and starboard rear suspension moveably attached between the port and starboard rear wheels and the frame inboard of the port and starboard rear wheels for allowing vertical motion of the port and starboard rear wheels, the port and starboard rear suspension having rear control arm lowered positions for extending the rear wheels for on-road driving and rear control arm raised positions for retracting the rear wheels for in-water driving;

a hull carrying the frame, the hull comprising;
   a bow;
   a stern;
   a bow portion extending from the bow to the at least one front wheel;
   a mid portion between the at least one front wheel and the rear wheels;
   a stern portion behind the rear wheels;
   a "V" shaped longitudinal center portion extending along a centerline of the hull from the bow portion to the stern portion; and
   rear wheel wells for the two rear wheels;
   port and starboard rear suspension cutouts in the hull bottom vertically aligned with the port and starboard rear suspension respectively, the rear suspension lowerable to the lowered positions through the suspension cutouts when the rear wheels are extended for on-road driving, and the rear suspension raisable to the raised positions above the suspension cutouts then the rear wheels are retracted for in-water driving; and
   port and starboard rear moveable flaps attached along one edge to the hull in front of the rear cutouts and vertically aligned with the port and starboard rear suspension cutouts, the rear flaps residing planar to the bottom of the hull when the rear suspension is in the raised positions for smoothing at least a portion of the rear suspension cutouts with the hull, and the rear flaps lowerable to vertically separate from the bottom of the hull to allow the rear suspension control arms to assume the lowered positions;
a vehicle body carried above the hull;
a power plant providing power;
a jet drive receiving power from the power plant and residing inside the hull at the stern of the hull for providing in-water propulsion; and
a drive mechanism receiving power from the power plant for driving the rear wheels for on-land propulsion, wherein:
the rear flaps sole attachment to rear lower control arms is by straps to pull the rear flaps upward against the hull when the rear control arms are raised; and
the rear flaps move downward when the rear lower control arms push down against the rear flaps to allow lowering the rear wheels.

9. The amphibious vehicle of claim 8, wherein; the at least one front wheel comprises two front wheels, and the amphibious vehicle further including:
   port and starboard front wheel wells for the front wheels, the front wheel wells formed in at least one of the hull and the body;
   port and starboard front control arms moveably attached between the front wheels and the frame inboard of the front wheels for allowing vertical motion of the front wheels, the control arms having a front control arm lowered position for extending the front wheels for on-road driving and front control arm raised positions for retracting the front wheels for in-water driving;
   front suspension cutouts residing in the hull bottom vertically aligned with the front control arms, the front control arms lowerable through the front suspension cutouts when the front wheels are extended for on-road driving and the front control arms raisable above the front suspension cutouts then the front wheels are retracted for in-water driving; and
   moveable front flaps attached along one edge to the hull and vertically aligned with the front suspension cutouts and residing planar to the bottom of the hull when the front control arms are in the front control arm raised positions smoothing at least a portion of the front suspension cutouts with the hull, and are lowerable to vertically separate from the bottom of the hull to allow the front suspension control arms to assume the front control arm lowered position.

10. An amphibious vehicle comprising:
a frame;
two front wheels supported by the frame;
a rack and pinion steering unit for turning the front wheels for on-land steering;
two rear wheels supported by the frame;
a hull carrying the frame, the hull comprising;
   a bow;
   a stern;
   a bow portion extending from the bow to the at least one front wheel;
   a mid portion between the at least one front wheel and the rear wheels;
   a stern portion behind the rear wheels;
   a "V" shaped longitudinal center extending along a centerline of the hull from the bow portion to the stern portion; and
a vehicle body carried above the hull;
a power plant providing power;
a jet drive receiving power from the power plant and residing inside the hull at the stern of the hull for providing in-water propulsion;
a Morse cable connected to the rack and pinion steering unit and connected to the jet drive to turn the jet drive for in-water steering;
a sliding member connected a steering arm of the rack and pinion steering unit to the Morse cable through a coupling mechanism;
the sliding member remaining in a first position relative to the coupling mechanism during an initial motion of the rack and pinion steering unit away from a centered position thereby directly coupling motion of the rack and pinion steering unit to the Morse cable;
the sliding member sliding relative to the coupling mechanism during further motion of the rack and pinion steering unit and not coupling the further motion of the rack and pinion steering unit into motion of the Morse cable; and
a drive mechanism receiving power from the power plant for driving the rear wheels for on-land propulsion.

11. The amphibious vehicle of claim 10, wherein the coupling mechanism comprises:
   a bell crank;
   a bell crank pivot;
   a slot in one leg of the bell crank, the sliding mechanism slidably residing in the slot;
   a spring urging the sliding member towards the end of the slot nearest to the pivot to couple motion of the steering arm to the Morse cable during initial motion of the steering arm away from the centered position and to allow the sliding member to slide in the slot during further motion of the sliding member away from the centered position to decouple the further motion of the steering arms from the Morse cable.

12. An amphibious vehicle comprising:
a frame;
at least one front wheel attached to the frame;
two rear wheels attached to the frame;
a hull attached to the frame, the hull comprising;
- a bow;
- a stern;
- a bow portion extending between the bow at least one front axle of the at least one front wheel;
- a mid portion between the at least one front axle and rear axles of the rear wheels;
- a stern portion extending from the rear axles to the stern;
- a "V" shaped longitudinal hull center portion extending along a centerline of the hull from the bow to the stern, the "V" having a depth of $D_H$ to a lowest point at a center of the hull center portion from a highest point at a center portion outside edge of the hull center portion in a cross-sectional view taken just behind the at least one front wheel;
- outside portions of the hull on each side of the hull center portion reaching to outside edges of the hull; and
- approximately vertical inward facing cutting edges extending along inside edges of the outside portions of the hull ahead of the rear wheels and having a cutting edge depth $D_S$ of between 25 percent and 75 percent of the depth $D_H$, for improving turning during in-water operation of the amphibious vehicle;

a body carried above the hull;
a power plant providing power;
a jet drive receiving power from the power plant and residing inside the hull at the stern of the hull for providing in-water propulsion; and
a drive mechanism receiving power from the power plant for driving the rear wheels for providing on-land propulsion.

13. The amphibious vehicle of claim 12, wherein the cutting edge depth $D_S$ is approximately 50 percent of the depth $D_H$.

14. An amphibious vehicle comprising:
a frame;
at least one front wheel attached to the frame;
two rear wheels attached to the frame;
a hull attached to the frame, the hull comprising;
- a bow;
- a stern;
- a bow portion extending between the bow at least one front axle of the at least one front wheel;
- a mid portion between the at least one front axle and rear axles of the rear wheels;
- a stern portion extending from the rear axles to the stern;
- a "V" shaped longitudinal center portion extending along a centerline of the hull from the bow to the stern; and a body carried above the hull;
an interior in the body for occupants;
at least one door for allowing entry into the interior, a lower edge of the door below a water line when the vehicle is in the water;
an interior side wall residing adjacent to and inwardly of the at least one door to prevent entry of water into the interior during in-water operation when the door is open;
a power plant providing power;
a jet drive receiving power from the power plant and residing inside the hull at the stern of the hull for providing in-water propulsion; and
a drive mechanism receiving power from the power plant for driving the rear wheels for providing on-land propulsion.

15. The amphibious vehicle of claim 14, further including a runner board residing between the door and the interior side wall for facilitating entry and exit from the vehicle in the water.

* * * * *